United States Patent [19]
Gachot

[11] 3,791,399
[45] Feb. 12, 1974

[54] PRESSURE REGULATORS FOR COMPRESSED-AIR CIRCUITS

[76] Inventor: Jean Gachot, 179 Avenue de la Division Leclerc, Enghien-les-Bains, France

[22] Filed: Mar. 7, 1972

[21] Appl. No.: 232,538

[30]     Foreign Application Priority Data
  Mar. 16, 1971  France .............................. 71.09088

[52] U.S. Cl. .............................................. 137/116
[51] Int. Cl. ............................................. F16k 31/36
[58] Field of Search .... 137/115, 116, 510, 528, 529

[56]         References Cited
         UNITED STATES PATENTS
3,578,014   5/1971   Gachot .............................. 137/115
3,329,154   7/1967   Morse et al. ....................... 137/116
3,395,722   8/1968   Heinrich ............................ 137/116

FOREIGN PATENTS OR APPLICATIONS
1,583,219  10/1969   France ............................... 137/115

734,810   8/1955   Great Britain ...................... 137/115
896,847   5/1962   Great Britain ...................... 137/529

*Primary Examiner*—Robert G. Nilson
*Attorney, Agent, or Firm*—Young & Thompson

[57]          ABSTRACT

The invention relates to improvements in a pressure regulator for a compressed air circuit. The regulator comprises a measuring chamber connected to the circuit and containing a pressure sensing element, and a regulating chamber connected to a compressor and having an orifice for admission to the measuring chamber, a discharge orifice and an obturator actuated by the pressure sensing element and adapted to open or shut off the discharge orifice according to whether the circuit pressure is higher or lower than predetermined values. According to the invention the regulator comprises a resilient check-valve capable of being applied against the admission orifice to the measuring chamber to prevent backflow of air during the displacement of the obturator.

1 Claim, 5 Drawing Figures

3,791,399

PRESSURE REGULATORS FOR COMPRESSED-AIR CIRCUITS

This invention relates to a pressure regulator for a compressed-air circuit, or reservoir.

There was described in U.S. Pat. application Ser. No. 821,006, now U.S. Pat. No. 3,578,014, a pressure regulator for a compressed-air circuit supplied by a compressor; this regulator comprises a measuring chamber connected to the compressed-air circuit and provided with a pressure-sensing element for measuring the pressure within said circuit, a regulating chamber connected to the compressor and having an orifice for admission to the measuring chamber, a discharge orifice and an obturator actuated by the pressure-sensing element so as to shut off the discharge orifice when the pressure within the reservoir is lower than a minimum value and to open said orifice when the pressure within said reservoir is higher than a maximum value.

This regulator has been designed for normal air pressures in the circuits which are of the order of 7 bars. One object of this invention is to extend the operating range above the usual range of pressures upto values of the order of 14 bars, for example. In fact, as is explained in the patent cited above, when the maximum pressure has been attained within the reservoir, the obturator carries out a movement of displacement so as to shut-off the orifice which provides admission to the measuring chamber and to open at the same time the orifice which serves to discharge to the atmosphere. During this displacement of the obturator, a communication is established between the measuring chamber and the discharge orifice. When the maximum pressure is very high, this communication causes a reflux of air from the compressed-air circuit to the regulating chamber, thereby entailing the risk of interfering with the action of the obturator as this latter closes the orifice which provides admission to the measuring chamber.

A first object of this invention is to permit the possibility of preventing said reflux as soon as the pressure within the regulating chamber has become lower than the pressure within the measuring chamber.

Furthermore, in the regulator which is disclosed in U.S. Pat. No. 3,578,014, the pressure-sensing element comprises a bellows-type diaphragm which is subjected on one side to the pressure of the air within the reservoir and, on the other side, to the pressure of a gas contained within the interior of the diaphragm. This diaphragm therefore constitutes a fluid-tight enclosure which is filled with gas at a reference pressure $P_o$.

The operation of this structure does not present any difficulty when the ambient temperature is of normal value. On the other hand, if this temperature attains extreme value (−40° C or +120° C, for example), there takes place a correlative variation in pressure of the gas contained within the diaphragm, namely the reference pressure $P_o$. This results in a modification of the maximum pressure P and minimum pressure p, as is apparent from the formulae which are given in U.S. Pat. No. 3,578,014.

A second object of this invention is to extend the operating range to extreme temperatures by permitting compensation for the influence of deviations from ambient temperature which are of substantial magnitude in comparison with temperatures normally encountered.

The regulator described in U.S. Pat. No. 3,578,014 comprises a reaction chamber into which opens the discharge orifice of the regulating chamber. Said reaction chamber is constituted by a cylinder in which moves a piston secured to the obturator, this piston being adapted to close-off slots which are formed in the cylinder and communicate with the atmosphere and to free said slots after the obturator has opened the discharge orifice.

This device has the disadvantage of being relatively costly to produce. Moreover, the slots are liable to become clogged with foreign substances such as dust particles or oil droplets which come from the reservoir.

A third object of this invention is to overcome the disadvantages just mentioned.

In accordance with the invention, the regulator of the type specified hereinabove essentially comprises a resilient check-valve fixed within the interior of the measuring chamber on the member which connects the obturator to the pressure-sensing element, said check-valve being capable of being applied by elastic deformation against the periphery of the admission orifice of the measuring chamber, in both positions of closure of the obturator.

Said resilient check-valve, which is applied against the periphery of the admission orifice as soon as the pressure within the regulating chamber becomes lower than that of the measuring chamber, prevents any backflow of air from the circuit to the regulating chamber. In the stage in which the circuit is supplied by the compressor, said check-valve is thrust back in the opposite direction as a result of overpressure of the air and does not setup any obstruction.

In a preferred embodiment, the diaphragm of the pressure-sensing element comprises an end-plate slidably mounted within the measuring chamber and the regulator comprises means for controlling the sliding motion of the end-plate.

By controlling this sliding motion, the internal volume of the diaphragm is caused to vary in the desired direction, thus making it possible to restore the reference pressure $P_o$ even when the ambient temperature attains extreme values.

In an advantageous embodiment, the reaction chamber comprises a cylinder into which opens the discharge orifice of the regulating chamber, said cylinder being provided with an orifice which serves to establish a communication with the atmosphere and is located at the end remote from said discharge orifice, and a piston rigidly fixed to the obturator and movable within said cylinder, the piston being adapted to shut-off the orifice which provides a communication with the atmosphere and to free said orifice only when the obturator has moved to a given distance from the discharge orifice of the regulating chamber.

Further properties of the invention will become apparent from the detailed description which is given hereinafter.

A number of embodiments of the invention are illustrated in the accompanying drawings which are given by way of non-limitative example, and in which.

Figure 1:
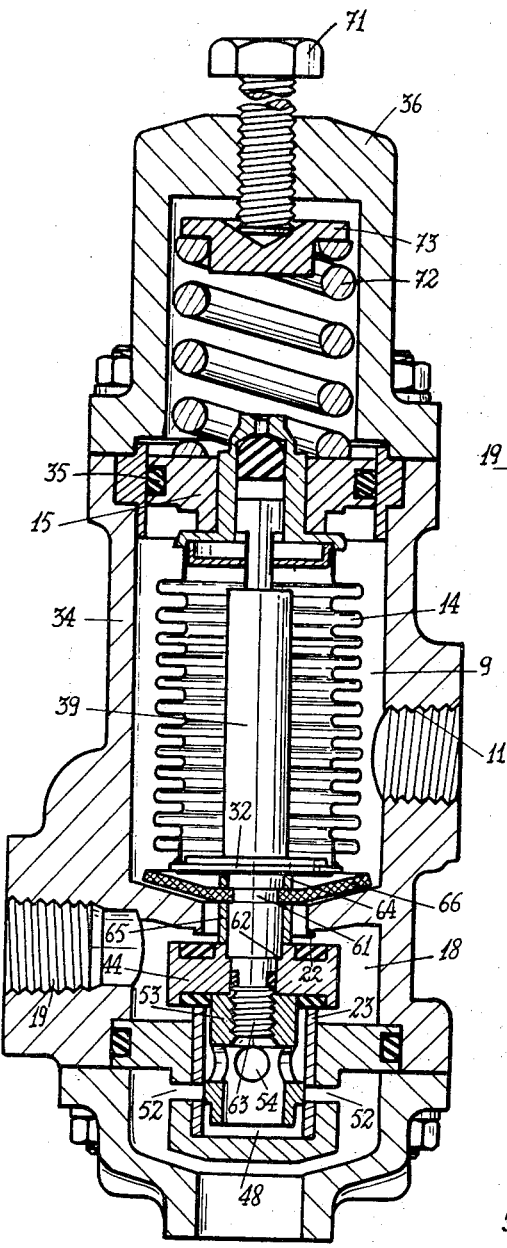
FIG. 1 is an axial sectional view of a regulator according to the invention, the regulator being shown in the position corresponding to the supply of the compressed-air circuit.
Figure 2:
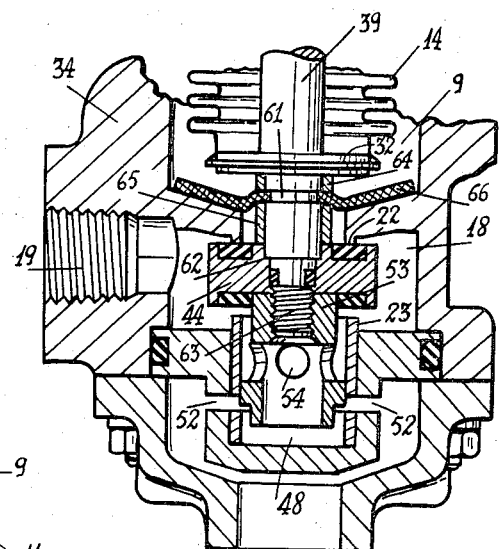
FIG. 2 is a partial axial sectional view showing the regulator of FIG. 1 in the position of connection of the compressor to the atmosphere.

The regulator which is illustrated in FIGS. 1 and 2 comprises a measuring chamber 9 provided with an orifice 11 which is intended to be connected to the compressed-air circuit to be controlled (not shown in the drawings). There is mounted within the chamber 9 a pressure-sensing element which consists of a bellows diaphragm 14 and this latter is tightly welded on the one hand to an end-plate 15 of the chamber 9 and on the other hand to a plug 32. The exterior of the diaphragm is subjected to the pressure developed within the chamber 9 which is equal to the pressure within the circuit to be controlled. The diaphragm 14 is subjected within the interior to a predetermined oppositely-acting force which, in the embodiment shown, is exerted by a gas contained within the diaphragm at a reference pressure $P_o$.

The regulator further comprises a regulating chamber 18 having an orifice 19 which is intended to be connected to a compressor (not illustrated). The chamber 18 also has an orifice 22 which communicates with the measuring chamber 9 and a discharge orifice 23. The orifices 22 and 23 are disposed in oppositely-facing relation.

The regulating chamber 18 additionally comprises an obturator constituted by a double valve 44 and this latter is attached to an axial rod 39 which is secured to the diaphragm 14. The valve 44 is so arranged that the orifices 22 or 23 can be shut-off selectively under the action of the diaphragm 14.

The discharge orifice 23 of the regulating chamber 18 opens into a reaction chamber 48 having a cylindrical volume and provided with two slots 52 which serve to establish a communication between the reaction chamber 48 and the surrounding atmosphere. A hollow piston 53 is displaceable within the interior of the chamber 48 and is secured to the double valve 44, the wall of said piston being pierced by four holes 54 which are spaced at 90° relative to each other. The end of the piston 53 is provided with an annular flange which is adapted in substantially fluid-tight manner to the internal diameter of the chamber 48. The length of the piston 53 is such that, when the valve 44 is applied against the discharge orifice 23, the annular flange closes-off the slots 52.

The axial rod 39 is provided externally of the diaphragm 14 with an annular groove 61, an annular shoulder 62 and a threaded end-portion 63. The obturator or double valve 44 is applied against the annular shoulder 62 by the piston 53 which is screwed on the threaded end-portion 63. There are fitted on the rod 39 a collar 64 which is located between the plug 32 and the annular groove 61, and a collar 65 which is located between said groove and the double valve 44. A check-valve 66 of resilient material such as rubber is placed in position within the groove 61, between the collars 64 and 65. The annular groove 61 is so arranged on the rod 39 that the check-valve 66 can be applied as a result of elastic deformation against the periphery of the admission orifice 22 in both positions of closure of the double valve 44.

The end-plate 15 of the diaphragm 14 is slidably mounted within the head end of the measuring chamber 9 and fitted with an O-ring seal 35. The cover 36 of the regulator body 34 carries a bolt 71. A helical spring 72 is interposed between the end-plate 15 and a cup 73 in which is fitted the extremity of the bolt 71.

The regulator operates in the following manner:

When the pressure within the compressed-air circuit to be controlled and within the measuring chamber 9 is lower than a minimum value $p$, the force of expansion of the gas contained within the diaphragm 14 is predominant, as was described in U.S. Pat. No. 3,578,014, and the double valve 44 is applied against the discharge orifice 23 as shown in FIG. 1. The orifice 22 which provides admission the measuring chamber is open and the compressor which is connected to the orifice 19 delivers into the compressed-air circuit, thereby increasing the pressure within said circuit. By reason of its resilience, the check-valve 66 is displaced from its seating as a result of the air pressure within the orifice 22 and does not set up any resistance to the flow of air.

When the pressure within the circuit attains a maximum value P, the force exerted by said pressure on the diaphragm 14 is of greater magnitude than the force of expansion of the gas within the interior of said diaphragm and the valve 44 is lifted from the discharge orifice 23. Since the slots 52 are at this moment still closed-off by the annular flange of the piston 53, the pressure P is established within the reaction chamber 48. Both faces of the double valve 44 are then subjected practically to the same pressure, so that the resultant of the pressure forces exerted on said valve is reduced to zero and the diaphragm 14 abruptly applies the valve 44 against the admission orifice 22 of the measuring chamber (as shown in FIG. 2).

During the displacement of the double valve 44, the piston 53 frees the slots 52 and the air contained within the chambers 18 and 48 passes out abruptly to the atmosphere, thereby carrying away the particles of water, oil and other impurities which may have been fed-in by the compressor.

Furthermore, as soon as the double valve 44 has become unseated from the discharge orifice 23 and as soon as the pressure within the regulating chamber tends to become lower than the pressure within the measuring chamber 9, the resilient check-valve 66 is applied against the periphery of the orifice 22, thereby obstructing said orifice until this latter is sealed-off by the double valve 44. The check-valve 66 therefore prevents any backflow of air from the circuit to be controlled towards the chamber 18 during the travel of the double valve 44.

The design function of the sliding end-plate 15 is as follows:

When the ambient temperature is very low, the pressure of the gas contained within the diaphragm 14 decreases and the thrust of the spring 72 on the end-plate 15 causes this latter to slide towards the orifice 22. In consequence, the internal volume of the diaphragm 14 then decreases, thereby increasing the pressure of the gas contained therein. If, on the contrary, the ambient temperature is very high, a correlative increase in the pressure within the interior of the diaphragm 14 causes the end-plate 15 to slide towards the cover 36, thereby increasing the internal volume of the diaphragm 14 and causing a reduction in pressure of the gas contained therein, the sliding motion of the end-plate 15 being limited by the opposing action of the spring 72.

The bolt 71 serves to regulate the initial compression of the spring 72.

As a result of a judicious choice of dimensions, of the force and of the initial compression of the spring 72, the result thereby achieved is to maintain the reference pressure $P_o$ at a practically constant value, which is the object of the second improvement.

Figure 3:
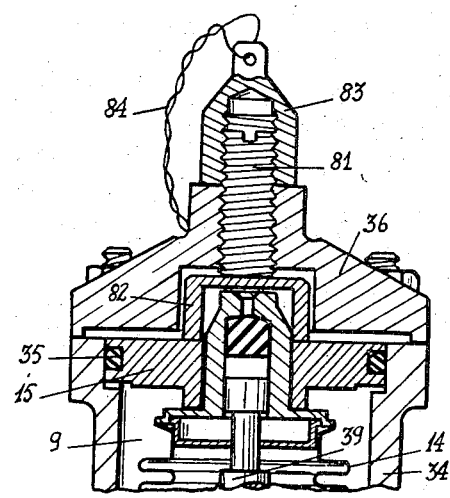
FIG. 3 is a partial axial sectional view of that portion of the regulator which comprises an end-plate for the diaphragm.

In FIG. 3, there is shown a simplified alternative form of construction of the device for regulating the reference pressure. The cover 36 is provided with an adjustable stop constituted by a threaded rod 81 having a slotted head. A cup 82 is interposed between the end-plate 15 and the rod 81. This latter is locked in position by means of an internally threaded cap 83 which is attached to the cover 36 by means of a retaining chain 84.

In the case of this device, it is by screwing or unscrewing the rod 81 within the cover 36 that the reference pressure $P_o$ within the interior of the diaphragm 14 is maintained when the ambient temperature attains extreme values.

Figure 4:
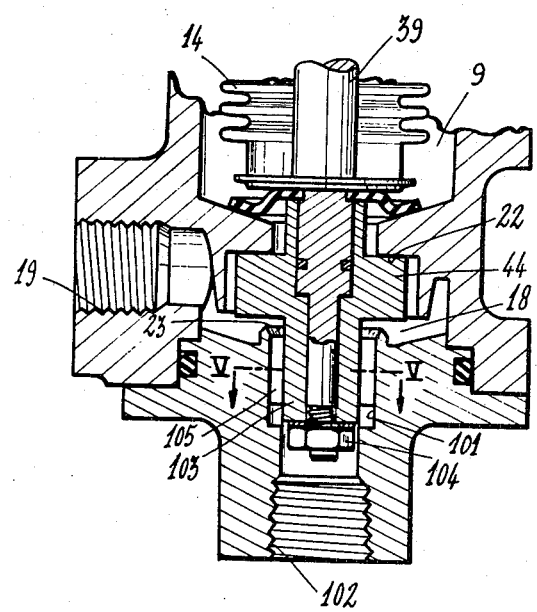
FIG. 4 is a partial axial sectional view showing an alternative form of construction of the reaction chamber.
Figure 5:
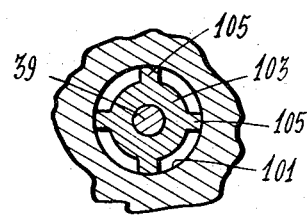
FIG. 5 is a sectional view taken along line V—V of FIG. 4.

An alternative form of construction of the reaction chamber is shown in FIGS. 4 and 5.

The reaction chamber comprises a cylinder 101 into which opens the discharge orifice 23 of the regulating chamber 18. At the end remote from the orifice 23, the cylinder 101 is provided with an orifice 102 which is put into communication with the surrounding atmosphere.

A piston 103 which is capable of displacement within the cylinder 101 is fitted over the actuating rod 39 of the diaphragm 14 and maintained locked against the double valve 44 of the regulating chamber by means of a nut 104. The piston 103 has four guide ribs 105 which are applied against the internal wall of the cylinder 101.

The length of the piston 103 is chosen so that, when the double valve 44 closes the orifice 23, the free extremity of the piston 103 penetrates into the orifice 102 which is provided for discharge to the atmosphere and shuts-off this latter. It is in this position that the compressor is put into communication with the circuit to be controlled in order to produce a pressure within this latter.

When the pressure within the circuit attains the design upper limit P, the diaphragm 14 contracts and causes the double valve 44 to be lifted from the seating of the orifice 23, as was explained earlier. At the beginning of this movement, the free extremity of the piston 103 still closes the orifice 102. The reaction chamber constituted by the interior of the cylinder 101 is thus brought to the pressure of the circuit. Since both faces of the double valve 44 are subjected to the same pressure, said valve is no longer subjected to any force of compressed-air, with the result that the valve 44 is abruptly applied by the diaphragm 14 against the seating of the opposite orifice 22. The air contained within the regulating chamber 18 and within the pipe which serves to connect the regulator to the compressor expands abruptly and escapes through the orifice 102 which is then released by the piston 103.

This design is simpler and therefore less costly than the form of construction which is illustrated in FIG. 1. Moreover, the large-section orifice 102 and the smooth surfaces of the piston 103 and of the cylinder 101 are readily cleaned as a result of abrupt expansion of the air, thereby removing any dust particles, oil drops and the like which come from the compressor.

As is clearly apparent, the invention is not limited to the constructional arrangements which have just been described and a large number of alternative arrangements may accordingly be contemplated without thereby departing either from the scope or the spirit of the invention.

What I claim is:

1. In a regulator for a pressurized-fluid circuit supplied by a compressor, said regulator comprising means defining a measuring chamber which communicates with the fluid circuit and having a pressure-sensing element for measuring the pressure within said fluid circuit and means defining a regulating chamber connected to the compressor and having an admission orifice which communicates with the measuring chamber through a transverse wall between said chambers, a discharge orifice and an obturator controlled by the pressure-sensing element to shut-off the discharge orifice when the pressure within the fluid circuit is lower than a predetermined minimum value and to open said orifice when the pressure within the circuit is higher than a predetermined maximum value, said regulator also comprising means defining a reaction chamber having a cylinder into which opens the discharge orfice of the regulating chamber, said cylinder having an orifice which establishes communication with the atmosphere and which is located at the end of said cylinder remote from said discharge orifice, and a piston rigidly fixed to the obturator and displaceable within said cylinder, said piston shutting off the orifice for communication with the atmosphere and opening said orifice only when said obturator has moved to a given distance from the discharge orifice of said regulating chamber; the improvement comprising a check-valve member comprising a resilient disc mounted coaxially over said admission orifice within said measuring chamber and substantially parallel with the surface of said transverse wall, the outer edge of said disc being contiguous to the surface of said transverse wall in both shut-off and open positions of the obturator.

* * * * *